United States Patent [19]

Wang

[11] Patent Number: 5,455,890
[45] Date of Patent: Oct. 3, 1995

[54] METHOD FOR STRUCTURING AN EXPERT SYSTEM UTILIZING ONE OR MORE NEURAL NETWORKS

[75] Inventor: Shay-Ping Wang, Long Grove, Ill.

[73] Assignee: Motorola, Inc., Schaumburg, Ill.

[21] Appl. No.: 129,275

[22] Filed: Sep. 30, 1993

[51] Int. Cl.$^6$ .................................................. G06F 15/18
[52] U.S. Cl. .............................. 395/22; 395/11; 395/21; 395/50; 395/52
[58] Field of Search .................................... 395/11, 3, 21, 395/22, 900, 50, 61

[56] References Cited

U.S. PATENT DOCUMENTS

| | | | |
|---|---|---|---|
| 5,121,467 | 6/1992 | Skeirik | 395/11 |
| 5,129,037 | 7/1992 | Kirk et al. | 395/11 |
| 5,255,344 | 10/1993 | Takagi et al. | 395/3 |
| 5,263,120 | 11/1993 | Bickel | 395/11 |

OTHER PUBLICATIONS

Hruska et al, "hybrid learning in expert networks"; International Joint Conference on Neural Networks, pp. 117–120 vol. 2, 8–14 Jul. 1991.

Hsu et al. "imprecise reasoning using neural networks", Proceedings of the Twenty–Third Annual Hawaii International Conference on System and Sciences, pp. 363–368 vol. 4, 2–5 Jan. 1990.

Hayashi et al, "fuzzy neural network with fuzzy signals and weights", International Joint Conference on Neural Networks, pp. 696–701 vol. 2, 7–11 Jun. 1992.

*Primary Examiner*—Allen R. MacDonald
*Assistant Examiner*—Tariq Hafiz
*Attorney, Agent, or Firm*—Bruce E. Stuckman; Walter W. Nielsen

[57] ABSTRACT

Neural networks learn expert system rules, for either business or real-time applications, to improve the robustness and speed of execution of the expert system. One or more neural networks are constructed which incorporate the production rules of one or more expert systems. Each neural network is constructed of neurons or neuron circuits each having only one significant processing element in the form of a multiplier. Each neural network utilizes a training algorithm which does not require repetitive training and which yields a global minimum to each given set of input vectors.

40 Claims, 8 Drawing Sheets

FACTS: $[x_1, x_2, x_3,]$

→ RULE 1: IF $z_1$ & $x_3$, THEN $y$
RULE 2: IF $x_1$ & $x_2$, THEN $z_1$

FIG. 3
—PRIOR ART—

FACTS: $[x_1, x_2, x_3,]$

RULE 1: IF $z_1$ & $x_3$, THEN $y$
→ RULE 2: IF $x_1$ & $x_2$, THEN $z_1$

FIG. 4
—PRIOR ART—

FACTS: $[x_1, x_2, x_3, z_1]$

RULE 1: IF $z_1$ & $x_3$, THEN $y$
RULE 2: IF $x_1$ & $x_2$, THEN $z_1$

FIG. 5
—PRIOR ART—

FACTS: $[x_1, x_2, x_3, z_1]$

→ RULE 1: IF $z_1$ & $x_3$, THEN $y$
RULE 2: IF $x_1$ & $x_2$, THEN $z_1$

FIG. 6
—PRIOR ART—

FACTS: $[x_1, x_2, x_3, z_1, y]$

RULE 1: IF $z_1$ & $x_3$, THEN $y$
RULE 2: IF $x_1$ & $x_2$, THEN $z_1$

FIG. 7
—PRIOR ART—

|  | $x_1$ | $x_2$ | $x_3$ | $z_1$ |
|---|---|---|---|---|
| EXAMPLE 1 | PL | ZO | NL | PL |
| EXAMPLE 2 | PL | PL | PM | NL |
| ⋮ | | | | |
| EXAMPLE $n_1$ | NL | NL | NL | PL |

*FIG. 9*

|  | $x_1$ | $x_2$ | $x_3$ | $z_1$ |
|---|---|---|---|---|
| EXAMPLE 1 | +1 | 0 | −1 | 1 |
| EXAMPLE 2 | 1 | 1 | 0.5 | −1 |
| ⋮ | | | | |
| EXAMPLE $n_1$ | −1 | −1 | −1 | 1 |

*FIG. 10*

|  | $x_4$ | $x_5$ | $x_6$ | $y_2$ |
|---|---|---|---|---|
| EXAMPLE 1 | PL | PL | PL | NL |
| EXAMPLE 2 | PM | PM | ZO | ZO |
| ⋮ | | | | |
| EXAMPLE $n_1$ | NL | NL | ZO | PM |

*FIG. 11*

|  | $x_4$ | $x_5$ | $x_6$ | $y_2$ |
|---|---|---|---|---|
| EXAMPLE 1 | 1 | 1 | 1 | -1 |
| EXAMPLE 2 | 1 | 0.5 | 0 | 0 |
| ⋮ | | | | |
| EXAMPLE $n_2$ | -1 | -1 | 0 | 0.5 |

*FIG. 12*

|  | $z_1$ | $x_4$ | $y_1$ |
|---|---|---|---|
| EXAMPLE 1 | PL | PL | NL |
| EXAMPLE 2 | PM | ZO | NM |
| ⋮ | | | |
| EXAMPLE $n_3$ | NL | NL | PL |

*FIG. 13*

|  | $z_1$ | $x_4$ | $y_1$ |
|---|---|---|---|
| EXAMPLE 1 | 1 | 1 | -1 |
| EXAMPLE 2 | 0.5 | 0 | -0.5 |
| ⋮ | | | |
| EXAMPLE $n_3$ | -1 | -1 | 1 |

|  | $x_1$ | | | | |
|---|---|---|---|---|---|
|  | -1.0 | -0.5 | 0 | +0.5 | +1.0 |
| -1.0 | +1.0 | +1.0 | +1.0 | +0.5 | 0 |
| -0.5 | +1.0 | +1.0 | +0.5 | 0 | -0.5 |
| $x_2$ 0 | +1.0 | +0.5 | 0 | -0.5 | -1.0 |
| +0.5 | +0.5 | 0 | -0.5 | -1.0 | -1.0 |
| +1.0 | 0 | -0.5 | -1.0 | -1.0 | -1.0 |

METHOD FOR STRUCTURING AN EXPERT SYSTEM UTILIZING ONE OR MORE NEURAL NETWORKS

RELATED INVENTIONS

The present invention is related to the following inventions which are assigned to the same assignee as the present invention:

(1) "Neural Network and Method of Using Same", having Ser. No. 08/076,601, filed Jun. 14, 1993;

(2) "Method for Converting an Existing Expert System into One Utilizing One or More Neural Networks" having Ser. No. 08/129,823, filed concurrently herewith.

TECHNICAL FIELD

This invention relates generally to expert systems and, in particular, to an expert system which utilizes one or more neural networks.

BACKGROUND OF THE INVENTION

In recent years, expert systems have been used in many applications which have traditionally been carried out using complex algorithmic approaches. These applications include medical diagnosis, financial analysis, electronics design, nuclear power plant monitoring and control, oil exploration, etc. Expert systems have also been used for interpretation, prediction, planning, monitoring, debugging, repair, and instruction. The surge in popularity of expert systems is mainly due to their simplicity in modeling complicated systems by Production Rules (i.e. IF/THEN rules) and to their capability in recommending appropriate actions by inference (or search).

A second known method of handling applications of the type mentioned above utilizes so-called "fuzzy logic", which makes use of fuzzy sets and fuzzy relational equations. In fuzzy set theory, quantifiers such as "for many" and "for a few" are used to relate elements of different sets. Fuzzy set theory, then, is useful in those situations in which data and relationships cannot be written in crisp mathematical terms. Simplicity and speed of design are two major advantages of fuzzy systems. Once an engineer has defined the variables and fuzzy sets, using intuition and experience, the design of a fuzzy logic control system prototype can be completed in a relatively short time.

A third known method of handling the above types of applications uses conventional artificial neural networks. An artificial neural network can be considered as a network of neuron-like units operating on data "all-at-once" rather than "step-by-step" as in a conventional computation. With neural networks, the problem of control can often be viewed as a pattern-recognition problem, wherein the patterns to be recognized are mappings of measured signals for "change" into calculated controls for "action". The ability to learn from experience to provide ever-improving performance is an advantage in using artificial neural networks for implementation of an intelligent controller. However, known artificial neural networks suffer from several significant problems, including the necessity for lengthy repetitive training of the networks, the fact that only local minimum solutions are generated, and the need for using trial and error techniques in structuring the number of neurons and layers of neurons in the network.

As will be seen, the present invention offers a unified approach which combines the best features of the above three techniques. But first let us review some of the characteristics of expert systems.

Figure 1:
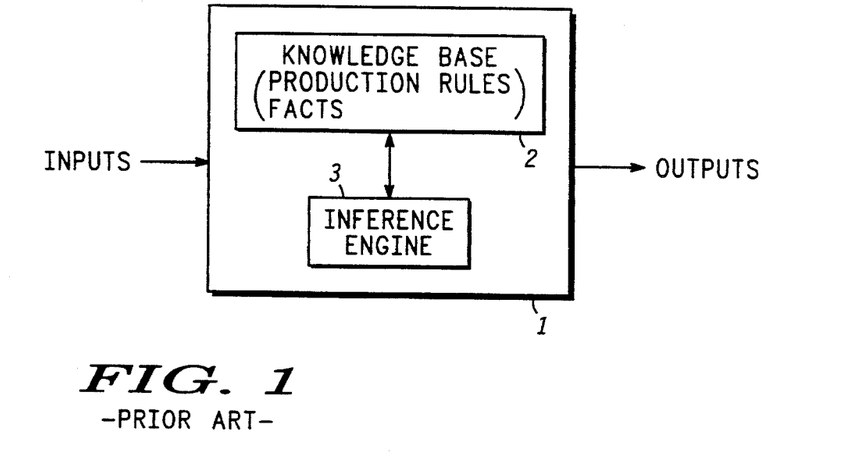
FIG. 1 shows a conceptual diagram illustrating a conventional expert system.

FIG. 1 shows a conceptual diagram illustrating a conventional expert system 1 which comprises two modules. A first module 2 is a Knowledge Base, which comprises a group of Production Rules (which typically are IF/THEN statements) and Facts. A second module 3 is an Inference Engine which makes decisions using the Production Rules and the given Facts. The expert system receives Inputs and generates Outputs using the Knowledge Base 2 and Inference Engine 3.

To date, however, the success of known expert systems has been somewhat diminished because of the following reasons:

First, known expert systems are too "brittle" for real-world applications which are noisy and uncertain. Specifically, the performance of an expert system rapidly degrades when the value of an Input is close to the Input bounds, as is illustrated by FIG. 2.

Figure 2:
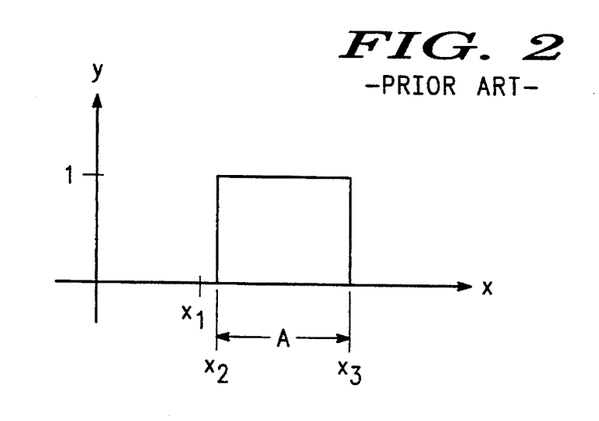
FIG. 2 shows a graph illustrating the brittleness of a conventional expert system.

FIG. 2 shows a graph illustrating the brittleness of a conventional expert system. For example, if an Input x has a specific value $x_1$, when we apply the following Production Rules the Output value y will be zero:

IF x is in set A (lying between $x_2$ and $x_3$), THEN y is 1.

IF x is not in set A, THEN y is 0.

Clearly, such brittleness is inappropriate for many applications (e.g. stock market investment, medical diagnosis, etc.). Although it is known to improve the robustness of an expert system by increasing the number of Production Rules, this slows down the decision-making process and aggravates maintenance problems (due to the sheer number of Production Rules to be kept track of).

Secondly, existing expert systems are usually too slow in decision-making for high-speed dynamic systems. This is because the Inference Engine needs to match the Facts to the Production Rules to make a decision. This pattern search can be very exhaustive, repetitive, and extremely time-consuming. This is illustrated, for example, in the extensive backward and/or forward chaining operations required, as discussed in *Guide to Expert Systems*, Donald A. Waterman, Edison-Wesley, 1986, Chapter 7, pages 66–69. An example of forward-chaining is shown in FIGS. 3–7 described below.

Figure 3:
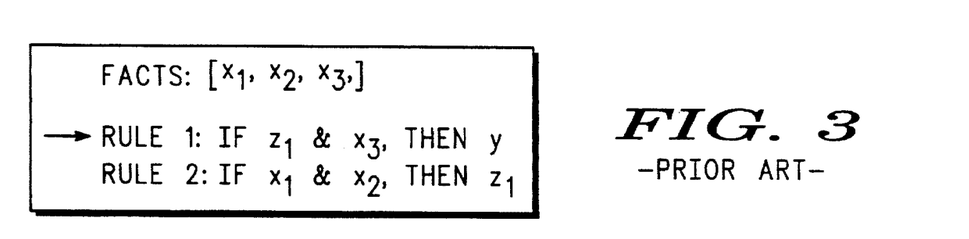
FIG. 3 shows a conceptual diagram of a Knowledge Base for a conventional expert system, wherein an Inference Engine checks to see whether a first rule is true or not.

FIG. 3 shows a conceptual diagram of a Knowledge Base for a conventional expert system. This example of a Knowledge Base has two Production Rules and a set of Facts comprising $x_1$, $x_2$, and $x_3$ representing the Inputs of the expert system. An Inference Engine (e.g. Inference Engine 3, FIG. 1) checks to see whether a given Rule is true by matching the set of Facts with the premise of such Rule. By "premise" is meant the clause immediately following the "IF" statement of the Production Rule. The "conclusion" is the clause immediately following the "THEN" statement.

First, still referring to FIG. 3, the Inference Engine checks to see whether Rule 1 is true by matching the given set of Facts with the premise of Rule 1. However, Rule 1 is not matched, because the Facts do not match its premise, since the Facts don't include $z_1$.

Figure 4:
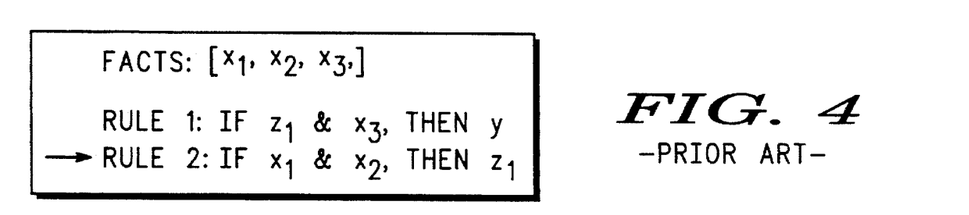
FIG. 4 shows a conceptual diagram of such Knowledge Base, wherein an Inference Engine checks to see whether a second rule is true or not.
Figure 5:
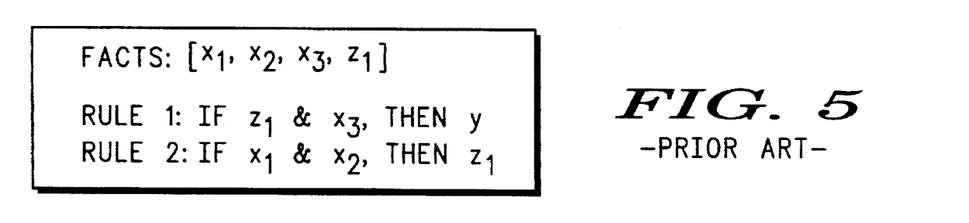
FIG. 5 shows a conceptual diagram of such Knowledge Base, wherein $z_1$ has been added to the Knowledge Base.

Referring now to FIG. 4, the Inference Engine checks to see whether Rule 2 is true by matching the given set of Facts with the premise of Rule 2. Rule 2 is matched, because the Facts include $x_1$ and $x_2$. Because Rule 2 is fired, the set of Facts will now include $z_1$, as shown in FIG. 5.

Figure 6:
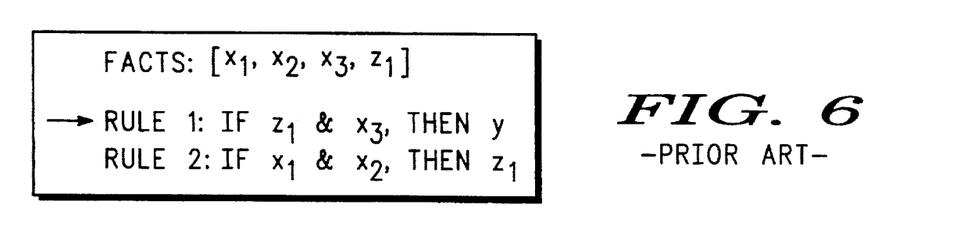
FIG. 6 shows a conceptual diagram of such Knowledge Base, wherein an Inference Engine checks to see whether a first rule is true or not.
Figure 7:
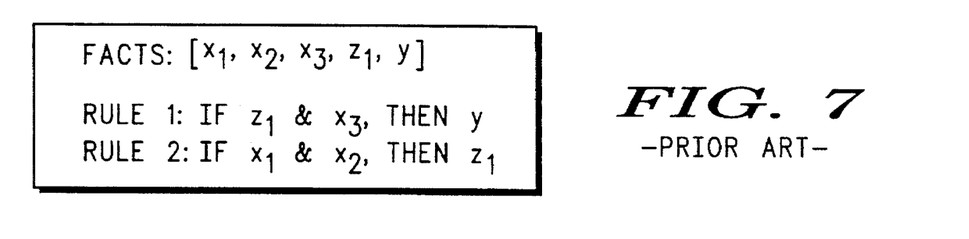
FIG. 7 shows a conceptual diagram of such Knowledge Base, wherein y has been added to the Knowledge Base.

Referring to FIG. 6, the Inference Engine checks to see whether Rule 1 is true by matching the set of Facts with the premise of Rule 1. Rule 1 is matched, because the set of Facts includes $z_1$ and $x_3$. Thus the expert system has made a decision (y is true), so that the set of Facts will include y from now on, as shown by FIG. 7.

The foregoing example of an Inference Engine illustrates the known technique of forward-chaining, which is very slow, because it is necessary to check all the rules. It will be appreciated that the known technique of backward-chaining is more efficient but involves a more complicated Inference Engine.

Because known expert systems are both brittle and relatively slow, they are rarely used in real-time applications.

Therefore, there is a substantial need for an expert system that is both robust enough and fast enough to handle a wide spectrum of business and real-time applications.

SUMMARY OF INVENTION

The present invention represents a combination of expert system, fuzzy logic, and neural network technologies.

A neural network first learns a group of given Production Rules and then produces one or more interpolated Outputs, either in real-time applications or non-time-critical applications. Groups of Production Rules may be linked together to form an expert system comprising a neural network for each group of Production rules. Each neural network utilizes a training algorithm which does not require repetitive training and which yields a global minimum to each given set of Input variables.

In the expert system of the present invention, each neural network, which learns a group of Production Rules for defuzzification, produces excellent interpolated Output, thereby significantly enhancing the robustness of the expert system.

Thus it is an advantage of the present invention to provide a method for structuring an expert system incorporating one or more neural networks. The neural networks may be implemented either in software or hardware.

It is likewise an advantage of the present invention to provide a method which uses a neural network to learn a group of Production Rules of an expert system.

It is additionally an advantage of the present invention to provide a method for structuring and utilizing an expert system which produces exact and/or interpolated outputs from a given set of inputs.

It is also an advantage of the present invention to provide an expert system having a neural network which implicitly processes a plurality of Production Rules in parallel.

It is another advantage of the present invention to provide an expert system that is very robust.

It is also an advantage of the present invention to provide an expert system that is extremely easy to tune, because it normally has only one variable to tune.

It is a further advantage of the present invention to provide an expert system that can control a large/complex system by massive parallel processing.

In one embodiment of the present invention there is provided a method for learning Production Rules of an expert system.

In another embodiment of the present invention there is provided a method for structuring an expert system incorporating at least one neural network.

According to one aspect of the invention, there is provided a method for learning production rules of an expert system comprising the steps of: (a) defining a plurality of inputs and outputs for the expert system; (b) defining at least one group of production rules by relating, for the at least one group, one of the outputs to one or more of the inputs in a certain manner; (c) defining a neural network, for the at least one group of production rules, comprising a plurality of neurons; and (d) computing the weights of the neural network.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

FIGS. 3–7 show a series of conceptual diagrams of how a conventional expert system operates.

In particular.

DESCRIPTION OF A PREFERRED EMBODIMENT

Figure 8:
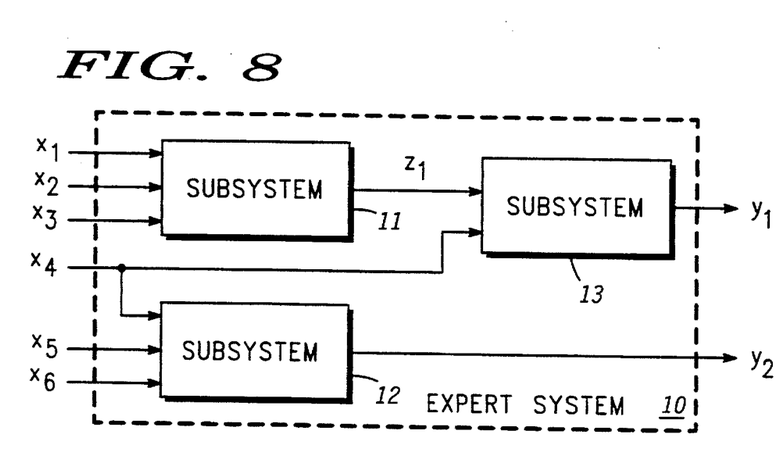
FIG. 8 shows a conceptual diagram illustrating how groups of Production Rules, or subsystems, are used to provide an expert system utilizing neural networks, according to a preferred embodiment of the present invention.

FIG. 8 shows a conceptual diagram illustrating how groups of Production Rules, each group constituting a subsystem, are used to provide an expert system utilizing one or more neural networks, according to a preferred embodiment of the present invention.

Expert system 10 comprises three subsystems 11–13. Each subsystem 11–13 comprises a group of Production Rules that links the given Inputs to the desired Outputs.

In addition, the three subsystems 11–13 are linked together, forming the expert system.

A first subsystem 11 receives a set of three Inputs $x_1$-$x_3$ and generates one Output $z_1$. A second subsystem 12 also has three Inputs $x_4$-$x_6$ and generates an Output $y_2$. A third subsystem 13 receives two Inputs, $z_1$ and $x_4$, and generates an Output $y_1$. It should be noted that Inputs $x_1$-$x_6$ to expert system 10 are external Inputs, and that $y_1$ and $y_2$ are external Outputs of expert system 10.

Figure 9:
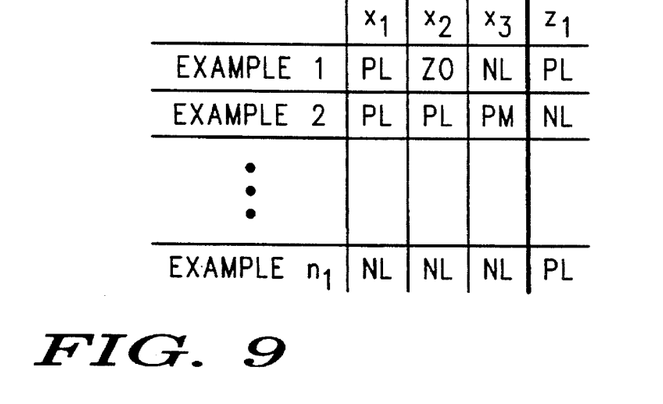
FIG. 9 shows a table illustrating the Production Rules for subsystem 11 in FIG. 8.

FIG. 9 shows a table illustrating the Production Rules for subsystem 11 in FIG. 8. In FIG. 9 the expressions PL, PM, ZO, NM, and NL represent an arbitrary set of N possible values for a given Input or Output. In FIG. 9, N is chosen to be five, so there are five possible values for a given Input or Output, represented by the values PL, PM, ZO, NM, and NL. It will be understood that there may be more or less than five possible values for a given Input or Output, depending upon the particular application.

In FIG. 9, NL represents a "negative large" value with respect to normal values of the variables; NM is a "negative medium" value; ZO is a zero value; PM is a "positive medium" value; and PL is a "positive large" value.

There are $n_1$ Production Rules or Examples shown in FIG. 9. For example, the first Example is IF $x_1$=PL, $x_2$=ZO, $x_3$=NL, THEN $z_1$=PL.

Figure 10:
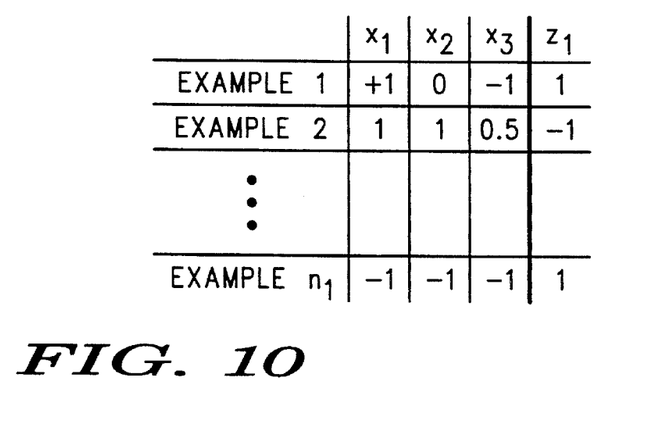
FIG. 10 shows quantified values for the table shown in FIG. 9.

FIG. 10 shows quantified values for the table shown in FIG. 9. For example, PL=+1, PM=+0.5, ZO=0, NM=−0.5, and NL=−1.0.

Figure 11:
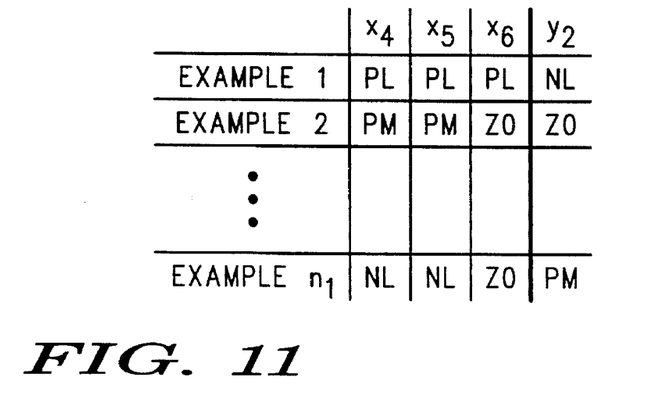
FIG. 11 shows a table illustrating the Production Rules for subsystem 12 in FIG. 8.
Figure 13:
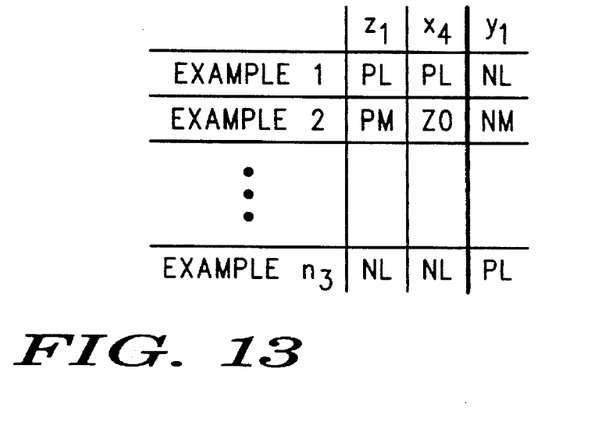
FIG. 13 shows a table illustrating the Production Rules for subsystem 13 in FIG. 8.

In similar fashion, FIG. 11 shows a table illustrating the Production Rules or Examples for subsystem 12 in FIG. 8, and FIG. 13 shows a table illustrating the Production Rules or Examples for subsystem 13 in FIG. 8.

Figure 12:
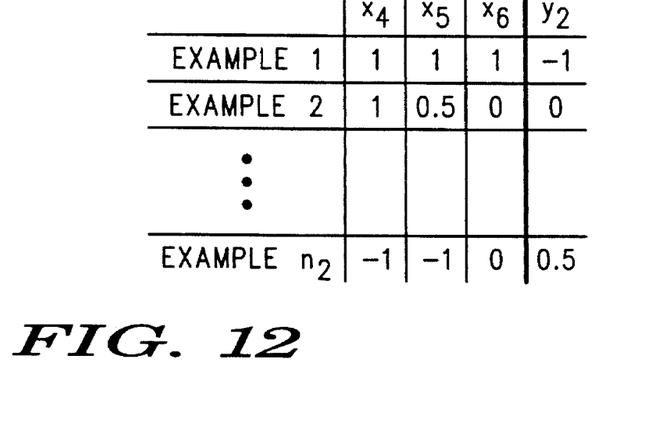
FIG. 12 shows quantified values for the table shown in FIG. 11.
Figure 14:
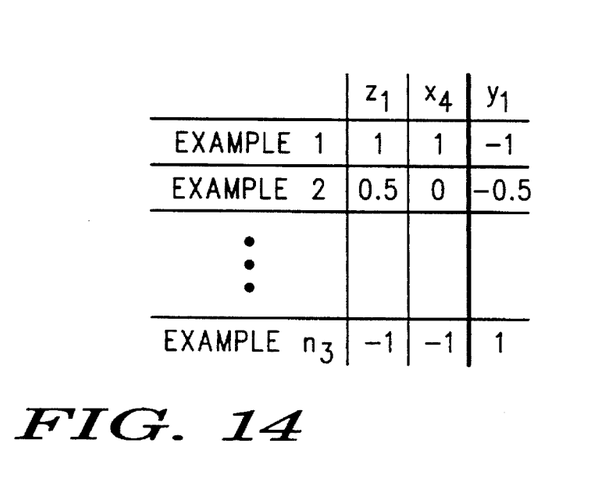
FIG. 14 shows quantified values for the table shown in FIG. 13.

Likewise, FIG. 12 shows quantified values for the table shown in FIG. 11, and FIG. 14 shows quantified values for the table shown in FIG. 13.

It will be appreciated that, regarding the Production Rules, any desired logical relationships may be employed to express the relationships between the Inputs and Outputs.

Regarding FIGS. 10, 12, and 14, the general process of transformation from x' to x (which =f(x')) may be referred to as normalization, meaning that the absolute value of x is between 0 and 1.

Figure 15:
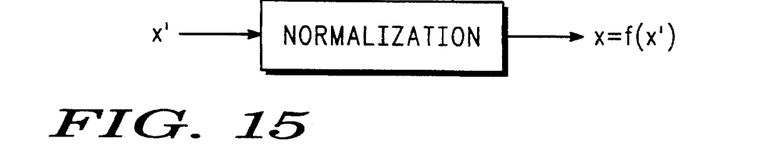
FIG. 15 shows a conceptual diagram of the normalization of an Input value x' to a normalized value x having a value between −1 and +1.

FIG. 15 shows a conceptual diagram of the normalization of an Input value x' to a normalized value x having a value between −1 and +1. The normalization is performed by appropriate, well-known means 20.

It will be understood, for example, regarding the Inputs $x_i$ shown in FIG. 8, that if such Inputs need to be normalized, normalization will be carried out by suitable means. In a preferred embodiment the function f(x') is a straight line given by $$x=f(x') \qquad \text{Equation 1}$$

$$x=ax'+b \qquad \text{Equation 2}$$

wherein |x|≦1 in a preferred embodiment. It will be understood that |x| may be greater than 1 in other implementations.

It will also be understood that normalization is a general process which is recommended but may not be required for special cases.

While in a preferred embodiment, the function f(x') is continuous, it will be understood that discontinuous functions may also be used.

Operation of Preferred Embodiment

In the present invention, for a given subsystem or group of Production Rules the generation of Outputs from Inputs is a three-stage process: (1) normalizing Inputs as described with reference to FIG. 15, (2) training the network, and (3) computing the interpolated Outputs from the neural network associated with such subsystem.

This three-stage process will be explained below.

Normalization of Inputs

Figure 16:
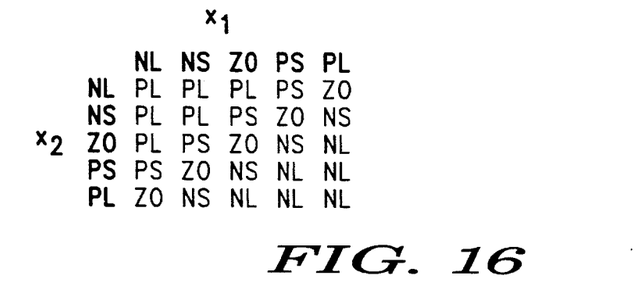
FIG. 16 shows Production Rules in table form for a process control problem.

FIG. 16 shows Production Rules in table form for a process control problem. This problem has two Inputs and one Output. For two given variables $x_1$ and $x_2$, the desired Output response y is illustrated by the table of FIG. 16.

In FIG. 16, NL represents a "negative large" value with respect to normal values of the variables $x_1$ and $x_2$ about their respective average, mean, or other selected centerpoint values; NS is a "negative small" value; ZO is a zero value; PS is a "positive small" value; and PL is a "positive large" value.

This table represents twenty-five Production Rules. For example, with reference to the upper left-hand corner of FIG. 16 the corresponding Production Rule is:

$$\text{IF } x_1\text{=NL AND } x_2\text{=NL, THEN y=PL} \qquad \text{Equation 3}$$

And so on. The Production Rules are derived from the practitioner's experience and/or knowledge about the problem to be solved. It will be understood that while it may be advantageous to utilize Production Rules to tackle a problem, it should be noted that Production Rules for an expert system are often very brittle (i.e. the Output cannot be interpolated but must be a specified value). Increasing the number of Production Rules improves the robustness of the expert system at the cost of computational complexity and maintenance difficulty.

Figure 17:
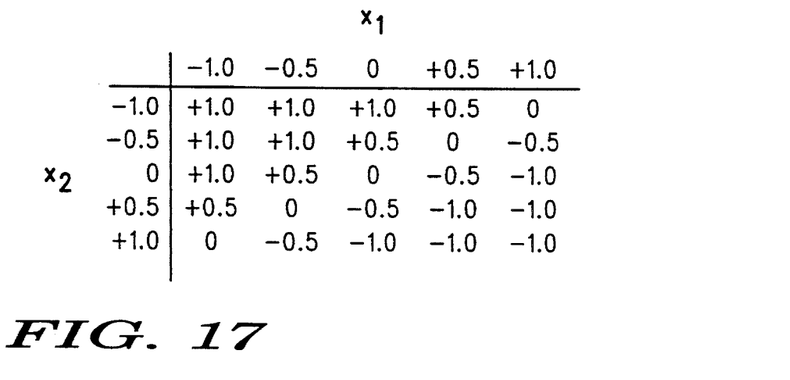
FIG. 17 shows quantified values for the table shown in FIG. 16.

FIG. 17 shows quantified values for FIG. 16. The variable $x_1$ is a continuous function of $x_1$'. For example, $x_1$ is f($x_1$'), as shown in FIG. 15. The same holds true for the relationship between $x_2$ and $x_2$', it being understood that different functions may apply to $x_1$ and $x_2$, respectively.

For the Input variables $x_1$ and $x_2$ we choose values for PL, PS, ZO, NS, and NL between −1 and +1. In this application, we choose PL=+1.0; PS=+0.5; ZO=0; NS=−0.5; and NL=−1.0. It will be understood that other appropriate values may be chosen for PL (e.g. +0.98 or +0.95), PS (e.g. +0.51 or +0.48), ZO, NS, and NL, and that there may be more or less than five possible values for a given input or output variable.

For the desired Output response y we choose PL=+1.0; PS= 0.5; ZO=0; NS=−0.5; and NL=−1.0. It will be understood that in this case the output response y has been normalized, using a process similar to that described regarding the normalization of input values, so that it can be fed as an input variable into another subsystem also employing a neural network, but that in the general case the output of the neural network does not have to be normalized.

The twenty-five Production Rules in FIG. 17 are now quantified. For example, by substituting values of NL for $x_1$, and NL for $x_2$, and PL for y in Equation 3, we get:

IF $x_1$=−1 AND $x_2$=−1, THEN y=+1    Equation 4

Of course, these values may be tuned, depending upon the application.

Training the Neural Network

Training the neural network associated with a given subsystem or group of Production Rules comprises two steps: (1) defining the number of neurons in the network to be less than or equal to the number of Production Rules of such subsystem, although it will be understood that the present invention may be implemented with a greater number of neurons than the number of Production Rules in the relevant subsystem; (2) computing the weights of the neural network, in the manner referred to in Related Invention No. 1.

After training has been completed, the network is ready for implementation.

Interpolation of Outputs

Figure 18:
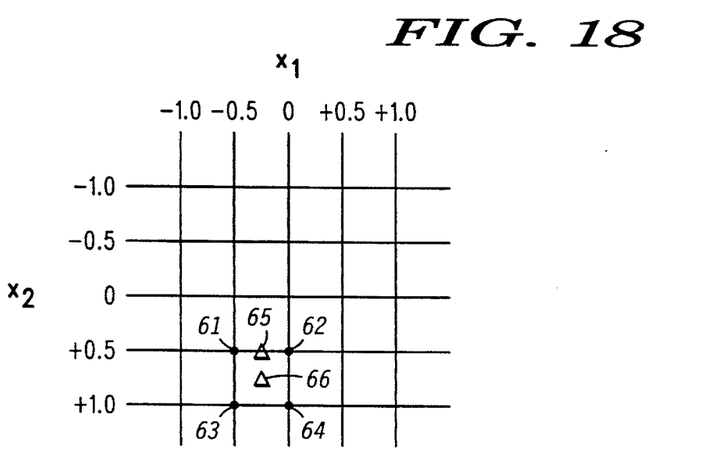
FIG. 18 shows an example of interpolation of the Outputs from a neural network.

FIG. 18 shows an example of interpolating the Outputs from a given network. In FIG. 18, each intersection, e.g. intersection 61, 62, 63, or 64, represents an "example" (i.e. an Input/Output set, such as $x_1$=−0.5, $x_2$=+0.5, y=0 in FIG. 17).

If the Input values $x_1$ and $x_2$ are equal to the Input values of one of the twenty-five examples, the Output y of the network will be identical or very close to the Output in the example. For instance if $x_1$=−0.5 and $x_2$=+0.5, then the network Output y will be identical or very close to 0.

If the Input values $x_1$ and $x_2$ are midway between examples 61 and 62 (i.e. at point 65), the Output y of the network will be identical or very close to the average of the Outputs corresponding to examples 61 and 62. For instance if $x_1$=−0.25 and $x_2$=+0.5, then the network Output y will be identical or very close to (0+(−0.5))/2=−0.25

Likewise, if the Input values $x_1$ and $x_2$ are at the center of examples 61–64 (i.e. at point 66), the Output y of the network will be identical or very close to the average of the Outputs corresponding to examples 61–64. For instance if $x_1$=−0.25 and $x_2$=+0.75, then the network Output y will be identical or very close to (0+(−0.5)+(−0.5)+(−1.0))/4=−0.5.

Thus the neural network produces either an actual Output or an interpolated Output for a given set of Input values.

Implementation of an Expert System Utilizing A Neural Network

In a preferred embodiment, there are two steps for computing or interpolating the Outputs: (1) normalizing the Inputs; and (2) generating the Outputs by providing the normalized Inputs to the network.

For details concerning the computation of Outputs, refer to Related Invention No. 1 and the following description.

Preferred Embodiment of Neural Network

Figure 19:
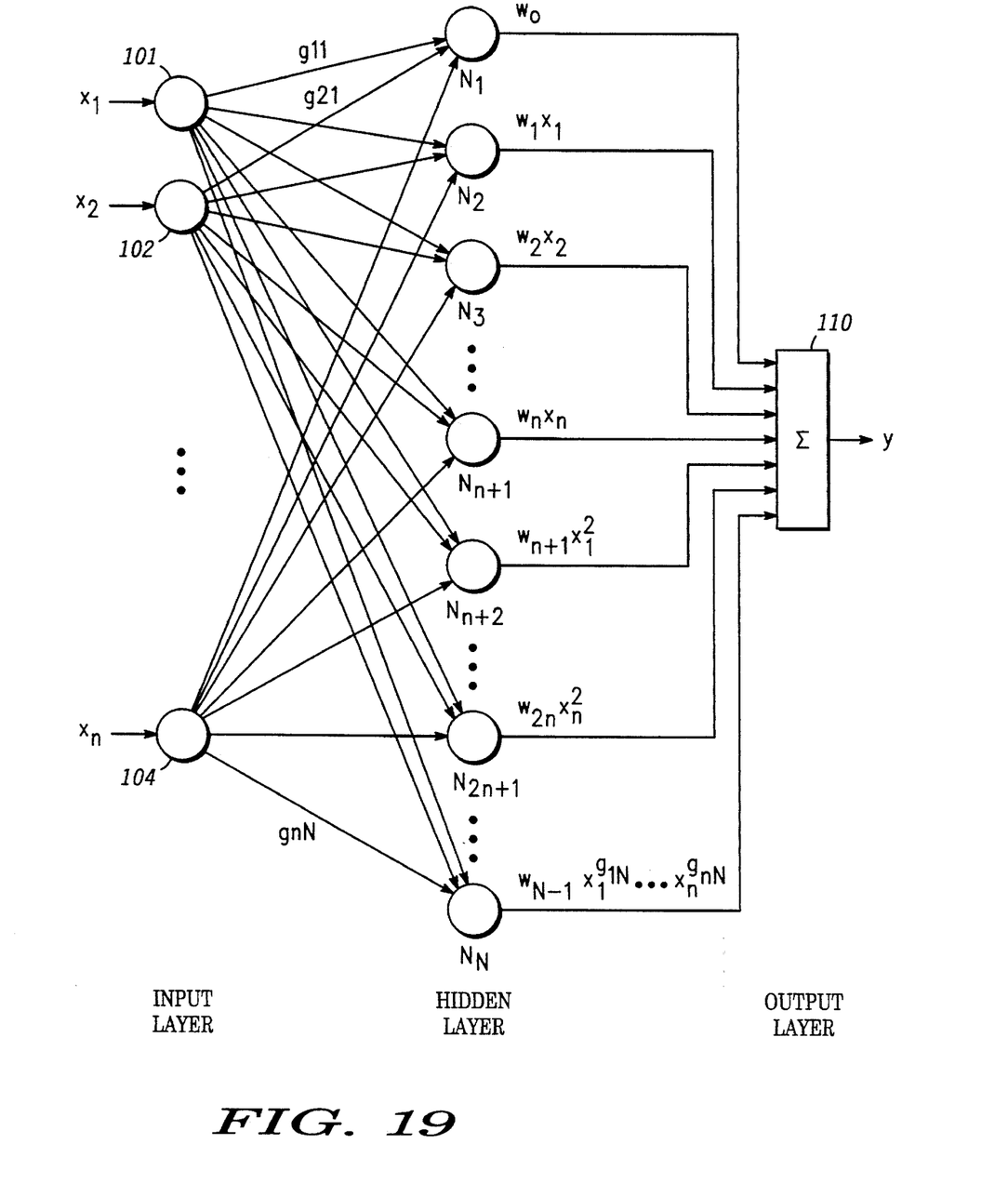
FIG. 19 shows a conceptual diagram of a neural network for performing an expert system computation in accordance with the present invention.

FIG. 19 shows a conceptual diagram of a neural network for performing an expert system computation in accordance with the present invention. A plurality of Inputs $x_1, x_2, \ldots, x_n$ are fed to Input nodes 101, 102, . . . , 104 of the Input Layer.

The Output of each input node 101, 102, and 104 in the Input Layer is coupled to each neuron circuit of the Hidden Layer (of which only neuron circuits $N_1, N_2, N_3, N_{n+1}, N_{n+2}, N_{2n+1}$, and $N_N$ are shown). For example, the Output of input node 101 is coupled to each of neuron circuits $N_1, N_2, N_3, N_{n+1}, N_{n+2}, N_{2n+1}$, and $N_N$, and to all other neuron circuits (not shown) in the Hidden Layer.

The same connections are made regarding the Outputs of input nodes 102, 104, and all other input nodes (not shown) in the Input Layer.

As described in Related Invention No. 1, the gated Inputs are first produced by the neuron circuit and then multiplied by the multiplier of the neuron circuit to produce the neuron Outputs.

The Outputs of neuron circuits $N_1, N_2, N_3, N_{n+1}, N_{n+2}, N_{2n+1}$, and $N_N$ are summed by summing circuit 110 to produce a network Output y.

As further explained in Related Invention No. 1, the operation of a neural network of the type employed in the present invention is based upon the use of a polynomial expansion and, in a loose sense, the use of an orthogonal function, such as sine, cosine, exponential/logarithmic, Fourier transformation, Legendre polynomial, radial basis function, or the like, or a combination of polynomial expansion and orthogonal functions.

A preferred embodiment employs a polynomial expansion of which the general case is represented by Equation 5 as follows:

$$y = \sum_{i=1}^{\infty} w_{i-1} x_1 g_{1i} x_2 g_{2i} \ldots x_n g_{ni} \qquad \text{Equation 5}$$

wherein $x_i$ represent the network Inputs and can be a function such as $x_i=f_i(z_j)$, wherein $z_j$ is any arbitrary variable, and wherein the indices i and j may be any positive integers; wherein y represents the Output of the neural network; wherein $w_{i-1}$ represent the weight for the ith neuron; wherein $g_{1i}, \ldots, g_{ni}$ represent gating functions for the ith neuron and are integers, being 0 or greater in a preferred embodiment; and n is the number of network Inputs. It will be understood that for practical applications of this neural network i will be a finite number and can be determined from the number of "examples", in the manner described in Invention No. 1 referenced above.

Each term of Equation 5 expresses a neuron Output and the weight and gating functions associated with such neuron. The number of terms of the polynomial expansion to be used in a neural network is based upon a number of factors, including the number of available neurons, the number of training examples, etc. Equation 5 may be expressed alternatively, as disclosed in Related Invention No. 1.

Each term of Equation 5 is produced by the Output of a neuron or neuron circuit. With regard to FIG. 19, for example, neuron circuit $N_1$ produces the term $w_0$. Neuron circuit $N_2$ produces the term $w_1 x_1$. And so on.

In using a preferred embodiment of the present invention, the number of neuron circuits of the neural network is selected to be equal or less than the number of examples presented to the network. An "example" is defined as one set of given Inputs and resulting Outputs.

For the neural network to be useful, the weight of each neuron circuit must be determined. This can be accomplished by the use of an appropriate training algorithm, as described in Related Invention No. 1.

While FIG. 19 shows only one summing circuit in the Output Layer, it will be understood by one of ordinary skill that two or more summing circuits may be used if a particular expert system application requires multiple Outputs.

Decoding of Expert System Outputs

As described above regarding FIG. 8, the values of the Outputs of the subsystems represented by neural networks are between +1 and −1. Therefore, they may need to be decoded to represent their actual values.

Figure 20:
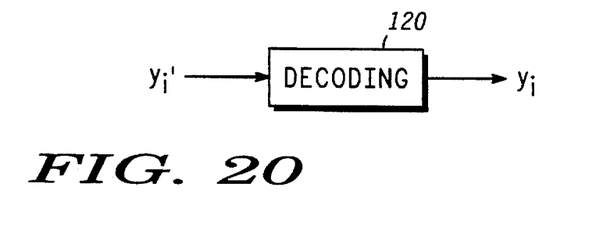
FIG. 20 shows a conceptual diagram of the decoding of a normalized Output value y' to an actual value y.

FIG. 20 shows a conceptual diagram of the decoding of a normalized Output value $y_i'$ to an actual value $y_i$ by suitable decoding formula 120.

It will be understood, for example, regarding the Outputs $y_i$ shown in FIG. 8, that if such Outputs need to be normalized, normalization will be carried out by suitable means. It will be appreciated that normalization will not be required in every case.

In a preferred embodiment the actual Output y is computed by the following equation:

$$y = ay' + b \qquad \text{Equation 6}$$

While the above is a linear equation between y and y', it will be understood that non-linear relationships between y and y' may be used.

It will be appreciated that an existing expert system comprises a large bundle of Production Rules. Through the method of the present invention, these rules are orderly grouped into a plurality of subsystems, each of which is governed by a selected group of the given Production Rules, which may be expressed by "IF/THEN" rules, or a table providing the relationship between inputs and outputs, or the like. Using the above-described method, each subsystem, as illustrated for example in FIG. 8, can be represented by a neural network of the type shown in FIG. 19. The Production Rules for each subsystem are expressed by a polynomial expansion (e.g. Equation 5), and at least one output, which may be an interpolated output, is computed from the polynomial expansion by substituting at least one input into the polynomial expansion and solving as explained above.

Description of Flowcharts

Figure 21:
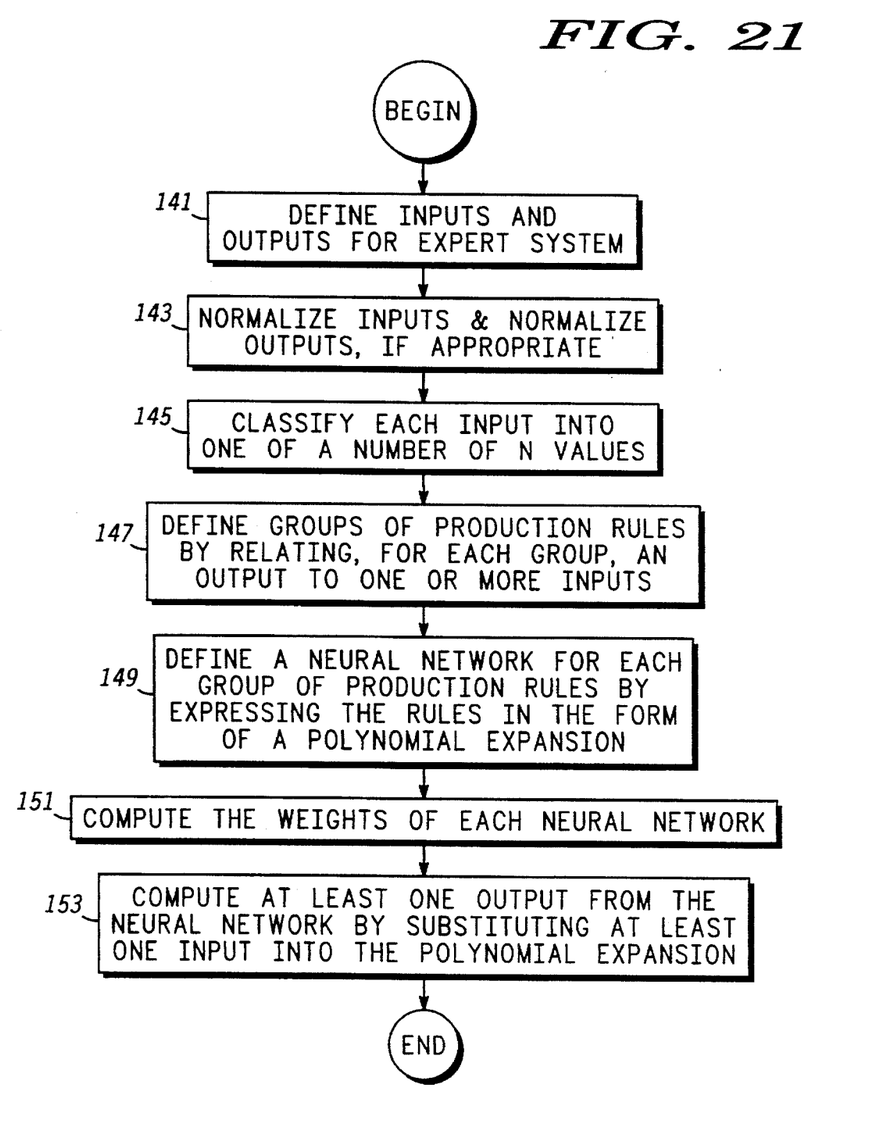
FIG. 21 shows a flow diagram of a method for learning Production Rules of an expert system in accordance with the present invention.

FIG. 21 shows a flow diagram of a method for learning Production Rules of an expert system in accordance with the present invention. First, referring to box 141, the Inputs and Outputs are defined for the expert system.

Next, in box 143 the Inputs are normalized. The Outputs may also be normalized, if appropriate (e.g. if an Output is an internal Output which will be fed to another neural network).

Next, in box 145 each Input is classified into one of a number of N values, N being a positive integer. In the example shown in FIG. 16 above, each Input was classified into one of five values.

Next, in box 147 a plurality of groups of Production Rules are defined by relating, for each of such groups, one of the Outputs to one or more of the Inputs in a certain manner.

Next, in box 149 a neural network is defined for each group of Production Rules by expressing the rules in the form of a polynomial expansion.

Next, in box 151 the weights of each neural network are computed.

Finally, in box 153 at least one Output is computed from at least one neural network by substituting at least one Input into the corresponding polynomial expansion. The Output may be either an exact value or an interpolated value.

Figure 22:
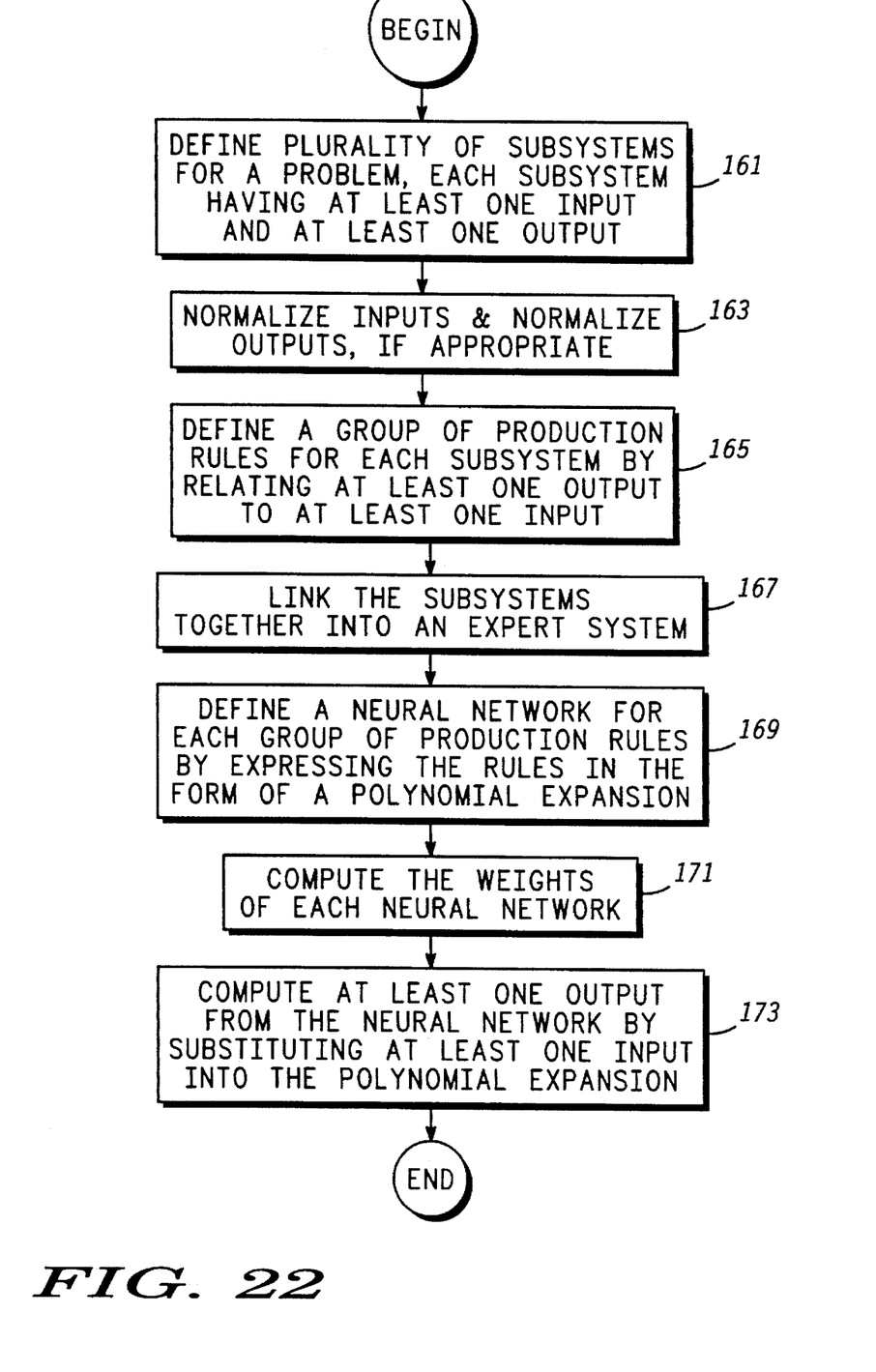
FIG. 22 shows a flow diagram of a method for structuring an expert system incorporating a neural network in accordance with the present invention.

FIG. 22 shows a flow diagram of a method for structuring an expert system incorporating a neural network in accordance with the present invention. First, referring to box 161, a plurality of subsystems are defined for a problem. Each subsystem has at least one Input and at least one Output.

Next, in box 163 the Inputs are normalized. The Outputs may also be normalized, if appropriate (e.g. if an Output is an internal Output which will be fed to another neural network).

Next, in box 165 a group of Production Rules is defined for each subsystem by relating at least one Output to at least one Input.

Next, in box 167 the subsystems are linked together into an expert system.

Next, in box 169 a neural network is defined for each group of Production Rules by expressing the rules in the form of a polynomial expansion.

Next, in box 171 the weights of each neural network are computed.

Finally, in box 173 at least one Output is computed from at least one neural network by substituting at least one Input into the corresponding polynomial expansion. The Output may be either an exact value or an interpolated value.

Conclusion

Thus there has been disclosed an expert system incorporating at least one neural network. The resulting expert system is extremely robust and fast, and it can be used in many time-critical and non-time-critical applications.

It will be understood that the neural networks disclosed and described herein may be implemented either in software or hardware.

Furthermore, it will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. A method for implementing production rules of an expert system using a neural network, said method comprising the steps of:

(a) defining a plurality of inputs and system outputs for said expert system;

(b) defining at least one group of production rules which define a relationship between one of said system outputs and at least one of said plurality of inputs;

(c) defining said neural network, said neural network having at least one network output, said neural network being responsive to said at least one of said plurality of inputs corresponding to said at least one group of production rules, and said neural network comprising a plurality of neurons;

(d) computing the weights of said neural network using training examples derived from the at least one group of production rules;

(e) expressing said neural network by a polynomial expansion: and (f) computing said at least one network output by substituting said at least one of said plurality of inputs into said polynomial expansion; wherein said one of said system outputs is based on said at least one network output.

2. The method recited in claim 1, wherein step (f) includes the substep of:

generating said at least one network output as an interpolated value.

3. The method of claim 2, wherein at least one of said system outputs is quantized into any one of a number of N quantified values, N being a positive integer, and said quantified values having a minimum value and a maximum value.

4. The method of claim 1, wherein step (a) further comprises the substep of normalizing said inputs.

5. The method of claim 4, wherein said normalizing substep is performed by transforming the inputs into values between −1 and +1.

6. The method of claim 4, wherein said normalizing substep is performed by transforming the inputs into absolute values between 0 and 1.

7. The method of claim 1, wherein in step (a) each input is quantized into any one of a number of N quantified values, N being a positive integer.

8. The method of claim 1, wherein step (a) further comprises the substep of normalizing at least one of the system outputs.

9. The method of claim 8, wherein said normalizing substep is performed by transforming said at least one system output into a value between −1 and 1.

10. The method of claim 8, wherein said normalizing substep is performed by transforming said at least one system output into an absolute value between 0 and 1.

11. A method for implementing an expert system with a plurality of neural networks, said method comprising the steps of:

(a) defining a plurality of subsystems for a problem, each subsystem having at least one input and at least one subsystem output;

(b) defining a group of production rules for each of said subsystems which define a relationship between said at least one subsystem output and said at least one input;

(c) linking said subsystems together to form said expert system;

(d) defining said plurality of neural networks, each of said neural networks corresponding to a respective subsystem, each of said neural networks responsive to said at least one input of said respective subsystem and having a at least one network output, each of said neural networks comprising a plurality of neurons;

(e) computing the weights of said plurality of neural networks using training examples for each of said neural networks derived from the group of production rules for said respective subsystem; and (f) expressing each of said neural networks by a polynomial expansion; and (g) computing said at least one network output from at least one of said neural networks by substituting said at least one input into said polynomial expansion corresponding to said at least one of said neural networks:

wherein said at least one subsystem output is based on said at least one network output.

12. The method recited in claim 11, wherein step (g) includes the substep of:

generating said at least one network output as an interpolated value.

13. The method of claim 12, wherein said at least one subsystem output is quantized into any one of a number of N quantified values, N being a positive integer, and said quantified values having a minimum value and a maximum value.

14. The method of claim 11, wherein step (a) further comprises the substep of normalizing said at least one input.

15. The method of claim 14, wherein said normalizing substep is performed by transforming said at least one input into a value between −1 and +1.

16. The method of claim 14, wherein said normalizing substep is performed by transforming said at least one input into an absolute value between 0 and 1.

17. The method of claim 11, wherein in step (a) said at least one input is quantized into any one of a number of N quantified values, N being a positive integer.

18. The method of claim 11, wherein step (a) further comprises the substep of normalizing said at least one subsystem output.

19. The method of claim 18, wherein said normalizing substep is performed by transforming said at least one subsystem output into a value between −1 and +1.

20. The method of claim 18, wherein said normalizing substep is performed by transforming said at least one subsystem output into an absolute value between 0 and 1.

21. A method for implementing an expert system with a plurality of neural networks comprising the steps of:

(a) defining a plurality of subsystems for a problem, each subsystem having at least one input and at least one subsystem output;

(b) defining a table for each of said subsystems, said table comprising at least one entry defining a relationship between said at least one subsystem output and said at least one input;

(c) linking said subsystems together to form said expert system;

(d) defining said plurality of neural networks, each of said neural networks corresponding to a respective subsystem, each of said neural networks responsive to said at least one input of said respective subsystem and having at least one network output, each of said neural networks comprising a plurality of neurons;

(e) computing the weights of said neural networks using training examples for each of said neural networks derived from the table for said respective subsystem;

(f) expressing each of said neural networks by a polynomial expansion; and (g) computing said at least one network output by substituting said at least one input into said polynomial expansion corresponding to one of said neural networks;

wherein said at least one subsystem output is based on said at least one network output.

22. The method recited in claim 21, wherein step (g) includes the substep of:

generating said at least one network output as an interpolated value.

23. The method of claim 22, wherein said at least one subsystem output is quantized into any one of a number of N quantified values, N being a positive integer, and said quantified values having a minimum value and a maximum value.

24. The method of claim 21, wherein step (a) further comprises the substep of normalizing said at least one input.

25. The method of claim 24, wherein said normalizing substep is performed by transforming said at least one input into values between −1 and +1.

26. The method of claim 24, wherein said normalizing substep is performed by transforming said at least one input into absolute values between 0 and 1.

27. The method of claim 21, wherein in step (a) said at least one input is quantized into any one of a number of N Quantified values, N being a positive integer.

28. The method of claim 21, wherein step (a) further comprises the substep of normalizing said at least one subsystem output.

29. The method of claim 28, wherein said normalizing substep is performed by transforming said at least one subsystem output into a value between −1 and +1.

30. The method of claim 28, wherein said normalizing substep is performed by transforming said at least one subsystem output into an absolute value between 0 and 1.

31. A method for utilizing an expert system implementable with a plurality of neural networks, said method comprising the steps of:

(a) defining a plurality of subsystems for a problem, each subsystem having at least one input and at least one output;

(b) defining a group of production rules for each of said subsystems which define a relationship between said at least one output and said at least one input;

(c) linking said subsystems together to form said expert system;

(d) defining said plurality of neural networks, one for each corresponding group of production rules, each of said networks comprising a plurality of neurons;

(e) computing the weights of said neural networks using training examples for each of said neural networks derived from the corresponding group of production rules;

(f) expressing each of said neural networks by a polynomial expansion:

(g) distributing a set of input values derived from said at least one input to at least one of said neural networks; and (h) said at least one neural network calculating an output value for said set of input values by substituting said set of input values into said polynomial expansion corresponding to said at least one of said neural networks.

32. The method recited in claim 31, wherein step (h) includes the substep of:

generating said output value as an interpolated value.

33. The method of claim 31, wherein step (f) further comprises the substep of normalizing said input values.

34. The method of claim 33, wherein said normalizing substep is performed by transforming said inputs into values between −1 and +1.

35. The method of claim 33, wherein said normalizing substep is performed by transforming said inputs into absolute values between 0 and 1.

36. The method of claim 31, wherein in step (a) said at least one input is quantized into any one of a number of N quantified values, N being a positive integer.

37. The method of claim 31, wherein step (a) further comprises the substep of normalizing said at least one output.

38. The method of claim 37, wherein said normalizing substep is performed by transforming said at least one output into a value between −1 and +1.

39. The method of claim 37, wherein said normalizing substep is performed by transforming said at least one output into an absolute value between 0 and 1.

40. The method of claim 31, wherein said output value is quantized into any one of a number of N quantified values, N being a positive integer, and said quantified values having a minimum value and a maximum value.

* * * * *